(12) United States Patent
Horton

(10) Patent No.: US 6,331,242 B1
(45) Date of Patent: *Dec. 18, 2001

(54) ANODIC ENCASEMENT CORROSION PROTECTION SYSTEM FOR UNDERGROUND STORAGE TANKS, AND METALLIC COMPONENTS THEREOF

(75) Inventor: A. Michael Horton, Trussville, AL (US)

(73) Assignee: United States Pipe and Foundry Company, Inc., Birmingham, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/598,745

(22) Filed: Jun. 21, 2000

Related U.S. Application Data

(63) Continuation-in-part of application No. 09/455,974, filed on Dec. 6, 1999, now Pat. No. 6,214,203.

(51) Int. Cl.$^7$ ........................................ C23F 13/00
(52) U.S. Cl. .................. 205/724; 205/730; 205/731; 205/732; 205/733; 205/735; 205/740; 204/196.1; 204/196.19; 204/196.22; 204/196.23; 204/196.24; 204/196.25; 204/196.37
(58) Field of Search ......................... 205/724, 730, 205/731, 732, 733, 735, 740; 204/196.1, 196.19, 196.22, 196.23, 196.24, 196.25, 196.37

(56) References Cited

U.S. PATENT DOCUMENTS

| | | |
|---|---|---|
| 2,404,031 | 7/1946 | Bunn et al. . |
| 2,817,634 | 12/1957 | McCall . |
| 2,855,358 | 10/1958 | Douglas . |
| 2,882,213 | 4/1959 | Douglas . |
| 3,202,596 | 8/1965 | Canevari . |
| 3,260,661 | 7/1966 | Kemp et al. . |
| 3,354,063 | 11/1967 | Shutt . |
| 3,490,497 | 1/1970 | Kennedy, Jr. . |
| 3,623,968 | 11/1971 | Bohne . |
| 3,629,091 | 12/1971 | George . |
| 3,629,092 | 12/1971 | George . |
| 3,887,449 | 6/1975 | Baer . |
| 3,994,794 | 11/1976 | Bohne . |
| 4,013,811 | 3/1977 | Maruska . |
| 4,133,737 | 1/1979 | Trimble . |
| 4,171,254 | 10/1979 | Koenecke . |
| 4,202,750 | 5/1980 | Khoury . |
| 4,397,726 | 8/1983 | Schwert . |
| 4,496,444 | 1/1985 | Bagnulo . |
| 4,626,330 | 12/1986 | Farmer . |
| 4,783,896 | 11/1988 | Stubbe et al. . |
| 4,838,208 | 6/1989 | Stubbe et al. . |
| 4,863,578 | 9/1989 | Webster . |
| 4,885,880 | 12/1989 | Sudrabin et al. . |
| 5,334,299 | 8/1994 | Roden . |

(List continued on next page.)

*Primary Examiner*—Bruce F. Bell
(74) *Attorney, Agent, or Firm*—Bradley Arant Rose & White LLP

(57) ABSTRACT

Corrosible metallic elements of tank are protected by an anodic encasement sleeve. The anodic encasement sleeve employs an inner sacrificial anodic layer and an outer environmental barrier layer to provide both cathodic and barrier protection against corrosion. Following application of the sleeve, typically by drawing or wrapping, the anodic encasement sleeve remains substantially unbonded from the tank, though it is electrically connected by conductive means. Because of the substantially unbonded relationship between the sacrificial anodic layer and the metallic elements of the tank, if electrolyte is present under the environmental barrier (due to breaches, installation error, condensation, etc.), the electrolyte may enter the unbonded area between the tank and the anodic material. This increases the ratio of anodic material to tank available, which makes the cathodic protection more efficient and effective for an extended duration.

19 Claims, 11 Drawing Sheets

U.S. PATENT DOCUMENTS

| | | |
|---|---|---|
| 5,341,562 | 8/1994 | Furuya et al. . |
| 5,415,745 | 5/1995 | Pultan et al. . |
| 5,505,826 | 4/1996 | Haglin et al. . |
| 5,714,045 | 2/1998 | Lasa et al. . |
| 5,910,236 | 6/1999 | Iossel et al. . |
| 6,214,203 * | 4/2001 | Horton .................................. 205/724 |

* cited by examiner

ANODIC ENCASEMENT CORROSION PROTECTION SYSTEM FOR UNDERGROUND STORAGE TANKS, AND METALLIC COMPONENTS THEREOF

This application is a continuation in part claiming priority to and benefit of previously filed application Ser. No. 09/455,974, filed Dec. 6, 1999, now U.S. Pat. No. 6,214,203 which is hereby incorporated by reference.

BACKGROUND OF THE INVENTION

1. Field of the Invention

This invention relates to a method and apparatus for an anodic encasement sleeve for preventing the corrosion of metallic materials particularly ferrous metals) of underground storage tanks, most particularly directed to situations in which the tank is buried in a corrosive soil. This invention accordingly has application to buried tanks and tank systems, and any other buried storage systems that contain components of iron, steel, or other corrosive metal, such as concrete reenforcing wires, cylinders, rods, and cables.

2. Description of Related Art

The prior art regarding anti-corrosion measures in corrosive environments can be most simply divided into cathodic protection and environmental barriers. Cathodic protection recognizes that much corrosion is due to electrolytic processes occurring in the soil; such protection seeks to override, reverse, or manipulate these electro-chemical forces in an effort to forestall the corrosive effects of such forces. Environmental barriers, more simply, employ electrolyte-impermeable materials to encase the metallic structure sought to be protected. Rather than manipulating the electrical properties, the environmental barriers attempt to electrically isolate the tank, cutting the electrical circuit altogether.

Cathodic protection manipulates the electro-chemical circuit occurring in the electrolyte (e.g., the soil) generally by one of two methods: impressed current or sacrificial anode. Both the sacrificial anode method and the impressed current method rely on altering the electrical exchange that is occurring in the electrolyte. When impressed current is employed, the tank is essentially connected to an external power supply. Because this external power supply expresses greater electrical potential than that possessed by circuit between the electrolyte and the tank, the electrochemical decay of the tank is controlled. A primary disadvantage of the impressed current method is its cost. On the front end, impressed current systems normally cost multiple times the expense of a barrier technology to design and install. Additionally, throughout the life of the tank, the impressed current must be continuously expended; in other words, the electrical bill represents a continuing expense. Finally, impressed current systems can be overridden by nearby structures shorting the circuit or interfering with the operation of the current in other ways. To account for such possibilities, impressed current systems require continuing monitoring and maintenance by trained personnel for the life of the system. The impressed current method thus represents a technically workable solution that is prohibitively wasteful and expensive.

Sacrificial anodes, in contrast to the impressed current method, harness the differences in electromotive properties among metals. By conductively attaching to the tank an anode constructed of a metal with a higher electromotive potential than the tank metal being protected, the anode will decay in preference to the tank. Rather than introducing an external electrical field, as in impressed current systems, the sacrificial anode becomes an internal component of the soil/tank electrical system. Disadvantages of the sacrificial anode approach include the ultimate exhaustion of the anode; once the anode has been consumed by corrosion, it leaves the tank unprotected. Furthermore, sacrificial anodes are notoriously inefficient. Estimates indicate that between approximately fifty per cent (for magnesium) and ten per cent (for zinc) of the sacrificial anode is lost due to "self corrosion" (e.g., the anode would corrode even in absence of its connection to the tank/soil circuit). Like impressed current, sacrificial anodes can be overridden by the effect of other structures or electrochemical systems in the soil. Accordingly, cathodic protection in its current forms represents an imperfect and wasteful solution to the problems of dependable corrosion protection over the life of a tank.

Given the waste inherent in sacrificial anode systems, not only do they suffer from inefficiencies, their useful life is limited by such wasting processes. Useful life is a critical factor in the selection of a tank material. The typical life of a cathodic protection system, however, is only approximately 20 years, requiring costly maintenance, replacement, and monitoring. Such activities further contribute to the waste inherent in the prior art cathodic systems.

The environmental barrier method offers a simple alternative to cathodic protection. Exemplary patents demonstrating use of environmental barriers include Wong et al., High Performance Composite Coating, U.S. Pat. No. 5,300, 336; and Samour, Method of Coating Pipe, U.S. Pat. No. 4,211,595. Such barrier technologies maybe as simple as trench backfill procedures in which inert sand or other material beds a pipe, or they may employ organic or inorganic bonded protective coatings adhered directly to the substrate pipe. Numerous problems with these bonded barrier technologies, however, continue to plague the ferrous pipe industry. Particularly, it is commonly recognized that organic protective coatings will deteriorate with time, depending on the coating utilized, surface preparation employed, application techniques, temperature experienced, and environmental conditions tolerated. Furthermore, in real-world conditions, a defect-free bonded coating is impossible to economically obtain; where voids ("holidays") caused by application errors or by installation damage exist, corrosion will take place. If bimetallic or stray current corrosion conditions exist, localized corrosion will be accelerated at these holidays, causing corrosion failure faster at the discrete point of holiday than if no coating had been applied to the tank. This is because the corrosion forces are cumulated at the discrete area of holiday, rather than being distributed along a more substantial surface area of the tank.

In addition to these performance-based shortcomings, such bonded coatings are (like cathodic protection systems) economically wasteful. Preparation may be exacting and expensive; frequently tanks must be blast cleaned to a near-white state to ensure sufficient adhesion of a coating. Time spent preparing the coatings at a manufacturing facility is sub-optimally spent, because coatings will inevitably be damaged in the harsh construction transportation and installation environment. An improved protection system must therefore be forgiving of rough handling and easy to repair in the field. On the other hand, preparation of a coating on-site demands substantial delays caused by not only the coating process itself, but also by weather conditions and by any cooling or curing periods required.

Recognition of these performance and economic disadvantages in respect of ductile iron pipe has lead to the development of a polyethylene encasement solution as applied to pipe, which is the subject of international standard ISO 8180 and U.S. standard ANSI/AWWA C105/A21.5. Such polyethylene encasement does not require bonding of the barrier to the pipe; rather, the encasement is installed as a "sleeve" that draws over the sections of pipe like a tubular jacket (known in the art as "encasement" or "encasing" the tank). Installation at the site is quick and efficient, requiring no special training or curing times. Of all of the above listed methods for corrosion control and protection of pipe, polyethylene encasement has been the most successful, most economical, and most widely used method of corrosion protection for iron pipes. Since its invention in 1951, polyethylene encasement has been specified by more than 1,200 engineers to successfully protect more than 10 million feet of gray and ductile iron pipe and fittings. However, even with this method's tremendous success, failures continue to occur under real-world conditions due to the realities that damage and improper installation are inevitable.

In an attempt to harness the advantages of both cathodic protection and barrier technologies, numerous attempts have been made to combine the two. This is typically done by laminating the tank with sacrificial coating, followed by a bonded outer layer of polyethylene or some other bonded barrier coating. Exemplary use of such solutions is treated in Kemp, et al., Sacrificial Metal Pipe Coatings, U.S. Pat. No. 3,260,661. Kemp teaches that bonding to a pipe a laminated coating comprising a dielectric environmental protective layer and sacrificial anode foil may obtain the advantages of both cathodic protection and barrier technology. Notably, Kemp exemplifies the understanding in the art by teaching that the laminates must be firmly adhered to the pipe to avoid seepage or capillary action that may draw electrolytic solutions between the pipe and the closest layer of the laminate in the event of a holiday. The rationale commonly taught in the art is that if the laminate is not securely bonded to the tank, a puncture to the environmental barrier may allow corrosion to occur beneath the environmental barrier at the intersection of the sacrificial anode, the electrolyte, and the tank, where corrosion by-products interfere with the cathodic protection and accelerate corrosion. Bagnulo, Method of Corrosion Protection, U.S. Pat. No. 4,496,444, similarly teaches the need to have a tight bond between the entire sacrificial anode layer and a pipe. Bagnulo employs a sacrificial anode layer continuously bonded to the pipe by an electrically conductive adhesive.

The problem with such adhesive-bonded systems is that the electrolytic process that occurs at a holiday may produce hydroxyl and hydrogen gas ions, which deteriorate the adhesive bond, allowing seepage and capillary action to draw electrolyte beneath the coating. Samour, U.S. Pat. No. 4,211,595, discusses this propensity in regard to the prior art of pipe protection. When the electrolyte is drawn beneath the closely bonded coating, the adhesive itself may interfere with the electrical circuit, preventing the proper cathodic reaction. Additionally, at relatively large areas of damage to the sacrificial anodic layer, the relatively small exposed surface of the anode (generally only the width of the bonded anodic layer, multiplied by the circumference of the tear) will relatively quickly passivate, reducing or eliminating its effectiveness for preventing corrosion. Beyond the activity of the relatively small exposed surface of the anode, the pipe is no longer protected, and is subject to accelerated localized corrosion, as occurs at holidays in the total absence of cathodic protection.

Similarly, Shutt, Method and System for Protecting Corrosible Metallic Structures, U.S. Pat. No. 3,354,063, discloses an electrically conductive bonded sacrificial coating that is constructed by including anodic material into a binder. The binder/anode eventually passivates on its exposed surfaces, to form an environmental/electrical barrier in situ. Shutt contemplates the use of special backfill chemicals to effect the passivation of the bonded coating and separate chemicals to influence the non-passivation of external sacrificial anodes. This disclosure falls prey to the above mentioned problems of small anodic surface area activity, especially where passivation chemicals may seep into the holidays along with the electrolyte. Furthermore, the special backfill procedures add to the complexity and expense of installation and the propensity for errors in handling and installation.

Other anode bonded coating systems employ arc-applied zinc to apply the sacrificial anode layer directly to a pipe, avoiding the above-mentioned potential for undercutting the adhesive. Such arc applications are initially expensive in terms of specialized application equipment, surface preparation, expertise required, and time delay. The expense of such applications is further exacerbated by the inefficiency of the arcing process, whereby up to fifty per cent of the sacrificial anode material may be lost. These arc applications, therefore, do not solve the problem of wasted material and inefficiency. Furthermore, the zinc coating is normally topcoated with a bonded impermeable polymeric layer which restricts the surface area of anode that is available to protect a holiday and is similarly limited as in the adhesively applied anode layers. This is because if mechanical damage results in a holiday on the anode, the area of damage to the anode may be relatively large (e.g., a matter of centimeters or inches). Because the anode is tightly bonded to the tank on the one side (e.g., to avoid seepage), and bonded to the environmental barrier on the other side (e.g., to prevent the initial entry of electrolyte), the only surface area available for anode activity is at the edges of the holiday, which may present a surface depth of no more than 0.001 inch in thickness. This surface area maybe quickly passivated, again leaving no active anode, even though the tank may be copiously coated along its entire length with perfectly good anode material. This expensive anode material remains worthlessly idle because of the intentionally tight bonding to the tank and the other bonded layers.

A critical unifying feature of the prior art teaching and embodiments is that the sacrificial anodic layer and environmental barrier must both be bonded in succession to the pipe, or, in the current case, the tank. The art teaches that space between the tank and the first coating layer (whether the sacrificial anode or a barrier layer) is to be avoided because seepage and capillary action may draw electrolytes into unprotected contact with the tank, leading to accelerated corrosion. This teaching has lead to the conclusion that use of unbonded sacrificial anode layers in conjunction with polyethylene "sleeve" encasement is not only unworkable, but is counterproductive. Furthermore, the use of external sacrificial anodes located outside (i.e. the soil side) of polyethylene "sleeve" encasement has been hindered (a) by the "self corrosion" of the anode material itself, (b) by difficulties in obtaining uniform protective current distribution along the length of the tank (which itself exhibits resistance), (c) by the added expense of welding external sacrificial anodes to the tank, and (d) by allowing for passages of the connectors through the sleeve without loss of environmental protection, as well as numerous other difficulties that shall be apparent to those skilled in the art.

OBJECTS OF TEE INVENTION

To provide a corrosion protection system for metallic tanks buried in electrolytic environments that is at once simple and convenient to install, as well as forgiving of installation damage.

To provide a corrosion protection system for metallic tanks buried in electrolytic environments that will shield against stray electrical currents of a magnitude normally encountered in the field.

To provide a reliable and economical corrosion protection system for metallic tanks buried in electrolytic environments.

To provide a no or low-maintenance corrosion protection system for metallic tanks buried in electrolytic environments that requires little or no monitoring.

To provide a combination cathodic I environmental barrier corrosion protection system for metallic tanks buried in electrolytic environments that is efficient, and in which the sacrificial anode is not wastefully corroded substantially or employed in the absence of a need to protect the tank from corrosive electrochemical forces.

To provide a combination cathodic/environmental barrier corrosion protection system for metallic tanks buried in electrolytic environments that maintains a longer useful cathodic protection life than prior art methods, due to the fact that cathodic protection elements remain substantially pristine and inactive until their service is required due to the occasion of a holiday, regardless of the length of time the environmental barrier remains holiday-free.

To provide a combination cathodic/environmental barrier corrosion protection system for metallic tanks buried in electrolytic environments, in which the cathodic protection elements when needed provide substantially uniform protective current distribution to the surface(s) needing protection.

To provide a corrosion protection system for metallic tanks buried in electrolytic environments that minimizes holidays while maximizing the surface area of sacrificial anode in circuit with, and substantially only with, the tank and the electrolyte present under the anodic encasement.

To provide a corrosion protection system for metallic tanks buried in electrolytic environments, which is quick, effective, and easy to repair in the field at the time of installation.

To provide a corrosion protection system for metallic tanks buried in electrolytic environments that is tolerant of the wide variety of surface conditions and characteristics found on various metallic tank, and that does not require extensive surface preparation.

To provide a corrosion protection system for metallic tanks buried in electrolytic environments that does not rely on, nor require, a substantially continuous, permanent, and tightly adherent bond to the entire surface of the tank.

Other objects of the invention will be obvious to those skilled in the art.

BRIEF SUMMARY OF THE INVENTION

The present invention applies sacrificial anode technology to "sleeve" environmental barrier encasement, creating an anodic encasement sleeve, a combination which was previously thought to be both ineffective and destructive. By the use of an anodic layer between the tank and the environmental encasement, the advantages of sleeve encasement and sacrificial anodes can be synergistically combined. The anodic layer may be a foil, a conductive binder containing anodic powder or particles, an anodic mesh, anodic strips (referably either longitudinally or spirally run), or any other form of anodic material.

This anodic encasement invention differs substantially from the prior art due in part to the recognition that the anodic layer does not need to be continuously bound to the tank. In fact, under the present invention, it is preferable that an interstitial space be present between the anode and the tank, within which space electrolyte may contact large surface areas of the tank-facing surface of the anode. In this situation, the anodic material is not continuously bonded to the tank surface (and a greater amount of the anodal material therefore will be available for connection with the electrolyte); therefore, if any electrolyte enters beyond the environmental sleeve, the entire surface area of the anodic surface nearest the tank is available to act as an anode. This provides for a greater efficiency of anodic activity, and minimizes the potential that the anode will be consumed or passivated at the discrete point of a holiday. In contrast to prior teachings, the present invention encourages a minimal "void" or electrolyte-permeable interstitial space between the anode and the tank, for such a space allows free flow of the electromotive forces among anode areas non-adjacent to the holiday. In such a configuration, the anodic encasement sleeve acts much like a wetsuit, maintaining a thin conductive layer of moisture as an electrical transport system to allow a greater surface area of anodic material to cathodically protect the exposed tank at a holiday. This allows potentially long lengths of anodic material to be employed, whereas under current art solutions, the anodic material even millimeters from a holiday is essentially worthless for cathodic protection. The encasement can be completed by securing the ends of the sleeve to the tank by any known means, including drawstrings, lanyards, compression straps, adhesives, or mechanical locking or constriction devices.

An additional advantage of the present invention is that the anodic material remains essentially uncorroded until a holiday occurs, unlike exposed-anodic systems in which the anode self-corrodes regardless of the presence or absence of holidays. Finally, by allowing for entry of electrolytic material between the tank and the anode/environmental barrier, the present invention contemplates that a holiday may allow entry of discrete electrolyte volumes, followed by a period during which no additional electrolyte enters the environmental barrier. Because the anodic layer is interposed between the tank and the environmental barrier, the discrete electrolytic volume may be acted upon until it is neutralized.

Yet another advantage of the present invention is its tolerance of textural variations, composition variations (i.e. iron or steel surfaces with or without oxidation and/or bonded coatings and concrete surfaces), and slight surface contamination. Traditional bonded coatings (whether anodic coatings or barrier coatings) normally require a high degree of surface preparation. Depending upon the materials involved, the tank may require a smooth, clean surface, a heated surface, or a rough surface. In almost all cases the tank must be thoroughly free of surface contamination and moisture. This requires, in many instances, blast cleaning to a near-white state for ductile iron tank. The present invention, by contrast, does not require such extensive surface preparation, and is tolerant of contaminant accumulations that inevitably accrue during manufacture, transportation, or storage. This is because no bonding is required to directly adhere to the tank. Furthermore, if a bonded coating is applied directly to the tank, the present invention obviates the need for the coating to be substantially uniform and holiday free.

BRIEF DESCRIPTION OF THE DRAWINGS

In the drawings, FIG. 1 a shows the optional inclusion of an intermediary layer between the tank and the anodic material, which layer may be either bonded (electrolyte permeable or impermeable) or unbonded (permeable only).

FIG. 7a represents a resilient environmental barrier, while FIG. 7b depicts a brittle environmental barrier such as an epoxy.

DETAILED DESCRIPTION OF THE INVENTION

Figure 1:
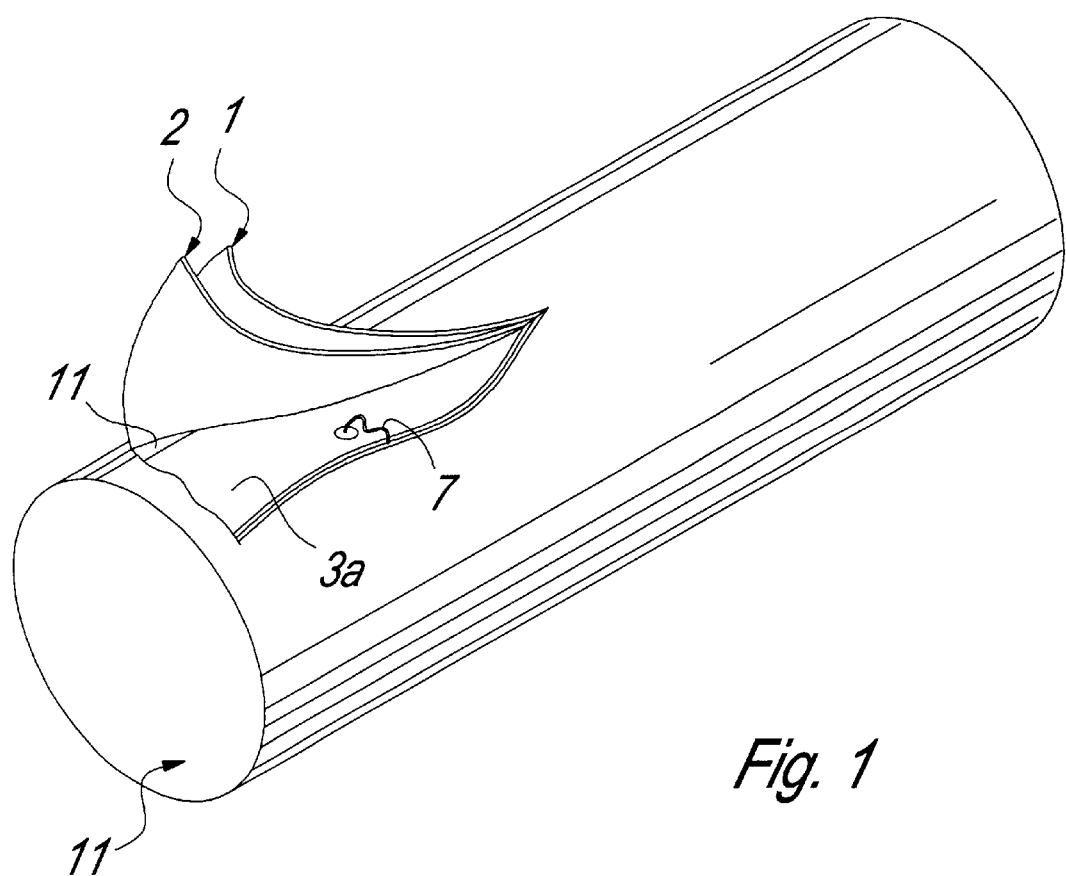
FIG. 1 is a drawing showing a tank encased in an anodic encasement sleeve according to the present invention, with the layers of the anodic encasement pulled back for individual viewing and clarity.
Figure 1A:
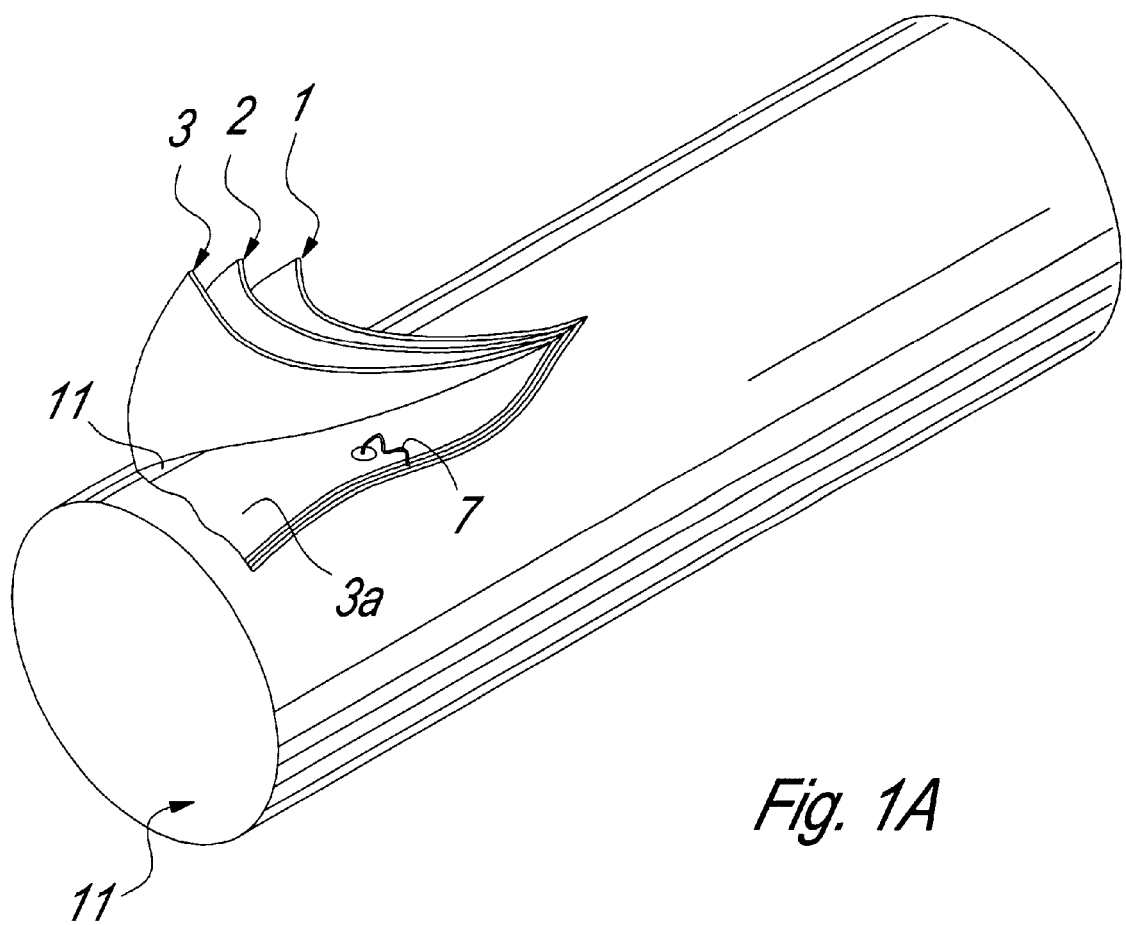

It will be appreciated by those skilled in the art that various modifications within the spirit of the invention may be made to the embodiments disclosed in this section for purposes of illustration. The invention is not to be limited to those particular embodiments, but only by the scope of the appended claims and their equivalents.

In recognition of the advantages of both environmental barriers and cathodic protection of metallic structures, the tank industry has attempted to combine both types of protection into several corrosion protection solutions. Until the present invention, however, the art has believed and taught that in a combined cathodic/barrier system, the coating must be directly bonded to the tank, which may be direct or adhesive bonding of the entire anodic material or barrier material. The present invention runs contrary to this teaching in the art by permitting—and, in fact, encouraging—an unbonded relationship between the tank 4 and the anodic material 2. This unbonded relationship anticipates and accepts the presence of an interstitial space 11 between the anodic material 2 and the tank 4, within which space electrolytic solution may flow if it has breached the environmental barrier 1. (See FIGS. 1–4, 8 and 9.) This interstitial space 11 may be intentionally maintained (e.g., by spacers, meshes, grids, electrolyte-permeable membranes, etc., as shown in FIGS. 1 and 5), or it may be dynamic (e.g., an unbonded area, the volume of which is maintained at a minimum due to the normal exterior pressures, which tend to urge the anodic material 2 into close proximity with tank 4 in the absence of intermediary layer 3, such as spacers, or electrolyte).

The invention thus provides, in simplified terms, that tank 4 (which term includes appurtenances, fittings, and any other tank structure) containing corrosible metal (such as ductile iron tank, steel tank, or steel reinforced concrete tank) may be protected by encasing it in a "sleeve" that is composed of at least two constituent areas. These areas are an outer environmental barrier 1 and a sacrificial anode material 2 that is electrically and environmentally isolated from the surrounding fill, but which is not bonded to tank 4, except via electrically conductive connections 7 spaced at intervals along the tank. The inventor recognizes that it may be possible in the art to construct the sleeve out of a single composite layer, having a gradient of electromotivity from the strongest electromotive potential in the surface facing tank 4, and the lowest electromotive potential in the outer surface, which faces toward the ground or other electrolytic exterior surfaces. Although such single composite layers may be possible, the inventor prefers to practice the invention as described in detail below.

As can be seen most clearly in FIG. 1, tank 4, representing the tank to be protected, forms the core of the completed corrosion protection system. In electrical communication with tank 4 is a sacrificial anodic material 2. On the side of anodic material 2 opposite tank 4, is environmental barrier 1, which encases both tank 4 and anodic material 2 to insulate both from environmental moisture and electrical currents. Electrical communication between tank 4 and anodic material 2 is achieved by the use of spaced connectors 7 to ensure free electrical flow. Such connectors 7 may be conductive adhesive or a hard connection such as a bolt, a weld, or wiring as depicted in FIG. 1. For the sake of ease of installation and integrity of tank 4, conductive adhesive is preferred. Such adhesives are well known in the art, and may be appropriately chosen for the intended application, depending upon variables such as thermal limits, as the application may require. Where tank 4 does not possess exposed metallic components (e.g., due to a concrete coating or an asphaltic paint, whether electrolyte permeable or impermeable), the electrical connection between sacrificial anode 2 and the metal sought to be protected remains critical, and may be addressed by drilling, welding, bolting, or mold-casting direct connections into the metal. In the event the tank 4 is coated with a thick impermeable bonded coating such as epoxy, polyurethane, tapewrap, etc., connection may be made by grinding or otherwise removing localized areas of coating to permit attachment of the sacrificial anode 2 by conductive adhesive or other method as previously described.

Sacrificial anodic material 2 can be any material containing at its surface closest to tank 4 sufficient amounts of a metal of higher electromotive potential than tank 4 to impart the tank-facing surface of anodic material 2 with an electromotive potential greater than tank 4. Typical metals for use with ferrous tank include zinc, aluminum, magnesium, or alloys of these metals. For reasons of cost and simplicity the inventor prefers the use of anodic foil, anodic mesh or expanded anodic metal grid 13, as shown most clearly in FIG. 5. Other solutions include the use of a laminate or composite composed of a binder containing a sufficient volumetric percentage of particles of such electromotive metals to impart an overall electromotive potential to the composite greater than that of the metal to be protected. Particular advantages of the binder/particulate construction may include the ability to construct the sacrificial anode in a manner that the binder retains a gradient of electromotivity from the tank surface outward, meaning that material 2 could perform an anodic function at its tank-facing surface, and an environmental barrier non-conductive function at the opposite surface. Although such a construction is within the scope of this invention, the inventor prefers a simple foil layer for reasons of simplicity and cost.

Figure 6:
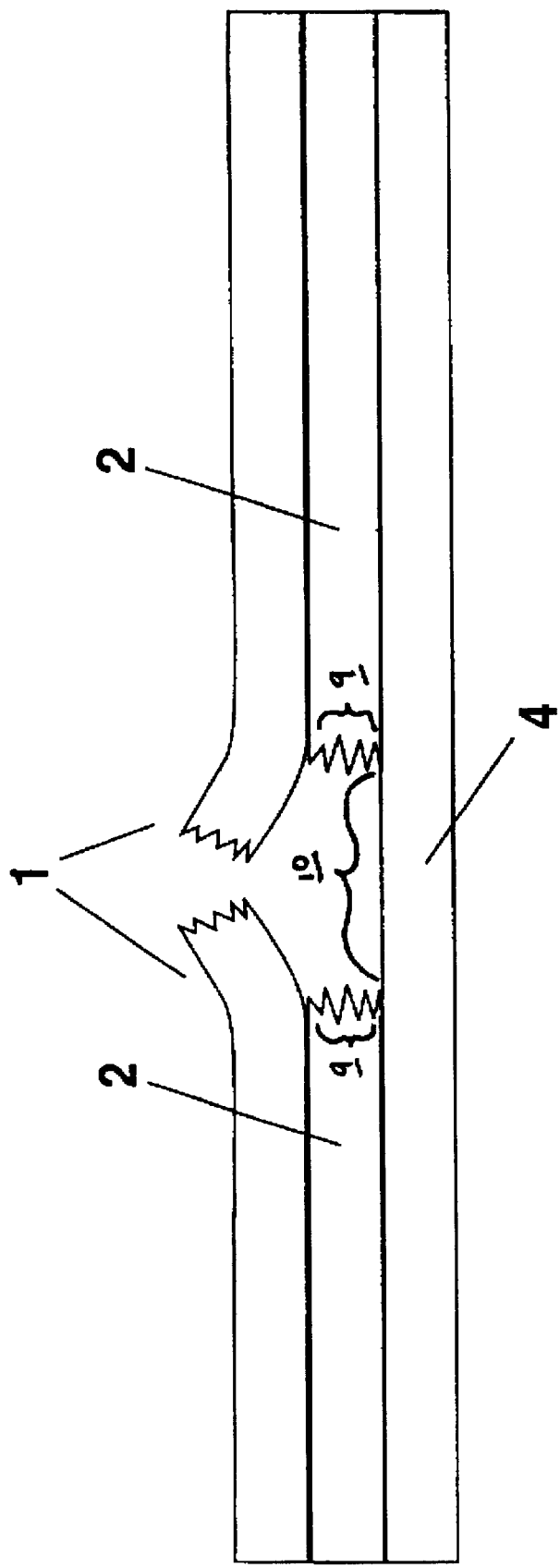
FIG. 6 provides a view of a relatively small holiday, in which the exposed surface of the tank is approximately equal to the exposed surface areas of the bonded anodic material.
Figure 7A:
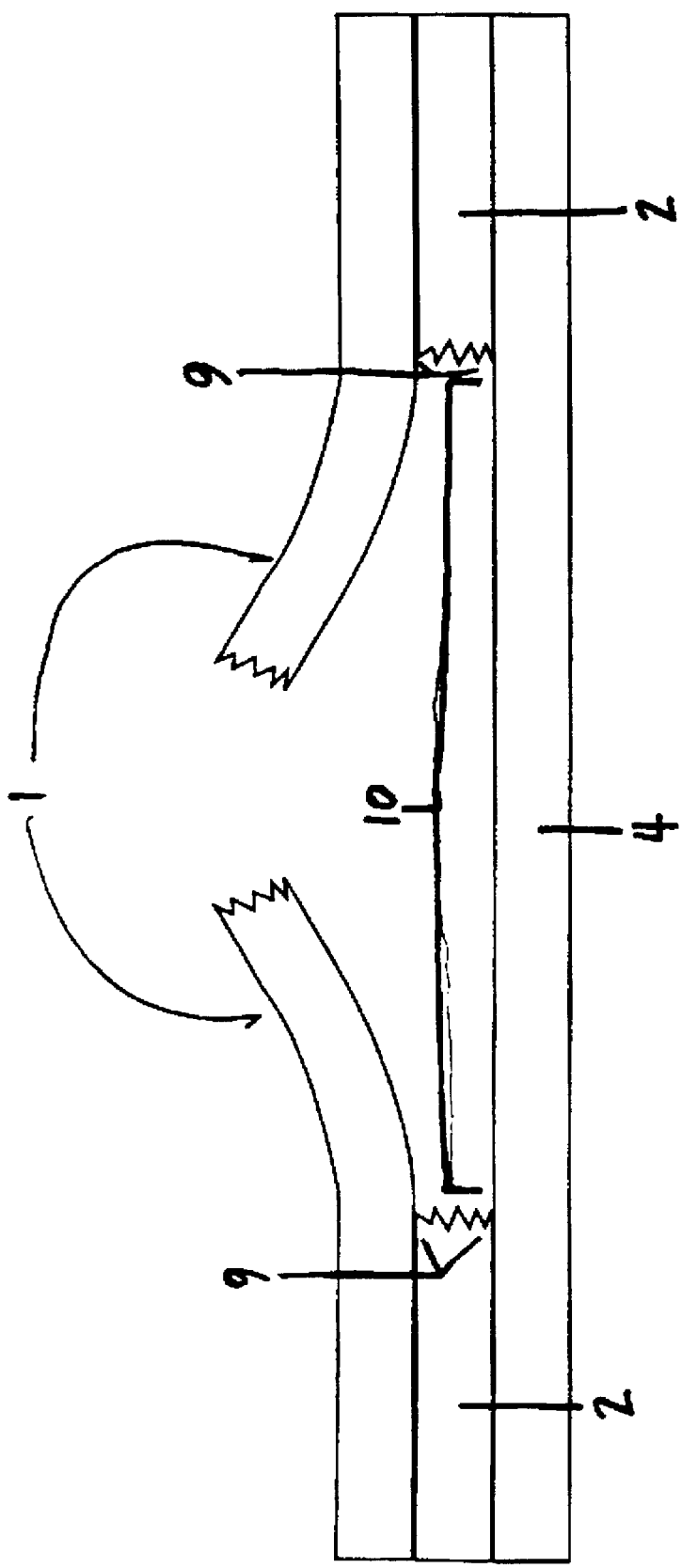
FIGS. 7a and 7b demonstrates the potential that the surface area of the exposed tank may be substantially greater than the actively exposed surface area of the bonded anodic material where a large holiday is present.

The present invention departs from the prior art, in significant part, by introducing the absence of a continuous bond between anodic material 2 and tank 4. The lack of bond is significant because it affects the exposed surface areas of both tank 4 (referred to as exposed tank 10 in FIG. 6, FIG. 7, and FIG. 8), and anodic material 2 (referred to as exposed anode 9 in FIG. 6, FIG. 7, and FIG. 8). Also, the lack of required bond is significant because this means little or no surface preparation of the metallic structure is needed. The efficiency and effectiveness of the cathodic protection provided by the sacrificial anode depends in large part upon the ratio of exposed anode 9 to exposed tank 10. Where the anode/tank surface area ratio is great (e.g., approaching or greater than one), the cathodic system operates with relative efficiency and effectiveness until the exposed tank 10 is sufficiently passivated to prevent further corrosion. Where the ratio is small, however, the exposed anode 9 available to the system is insufficient to effectively drive the cathodic system efficiently and will be expended quickly. Exposed tank 10 will therefore corrode at an increasingly rapid pace, particularly if the exposed anode 9 passivates to a non-conductive state. Exemplary damage presenting a small ratio of exposed anode 9 to exposed tank 10 is depicted in FIG. 7 (*a* and *b*), where the area of exposed tank 10 is approximately equal to five to six times the exposed surface area of the anodic material 2 (the exposed surface area of anodic material 2 is equal to the thickness of the anodic layer—a matter of hundredths or thousandths of an inch—multiplied by the length of the periphery of the breach). As can be seen from FIG. 6, the only the edges of the tear through anodic material 2 will present exposed anode for activity in the cathodic cell.

Figure 2:
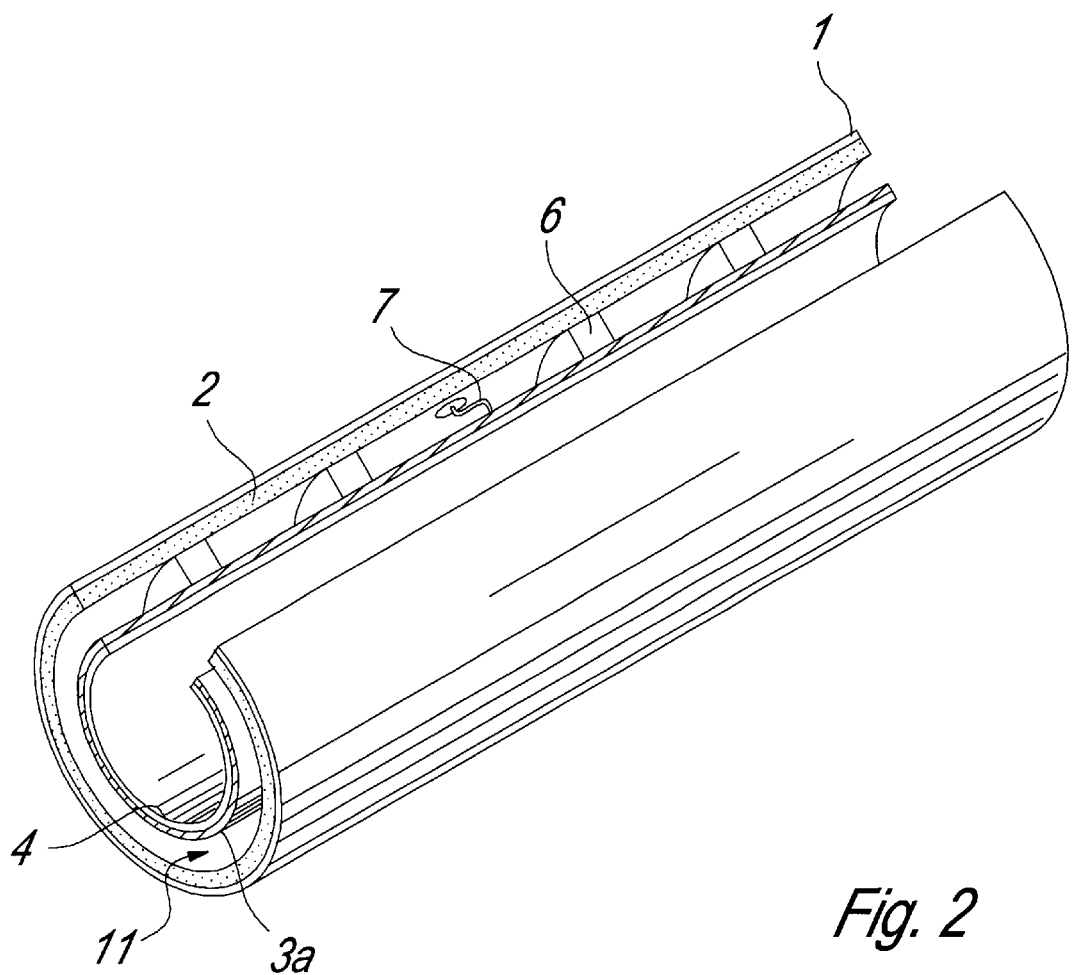
FIG. 2 represents an alternative embodiment of the present invention with spacers in the interstitial layer evident by cut-away view.
Figure 8:
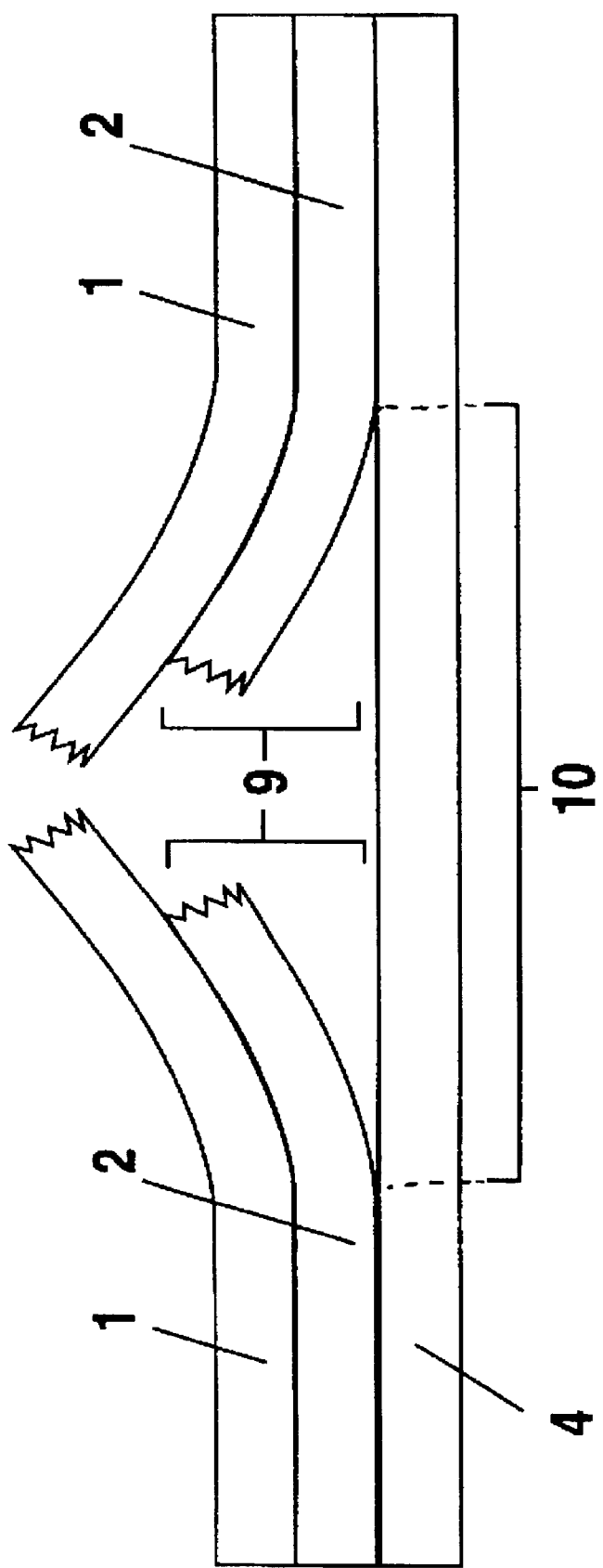
FIG. 8 shows the lifting of anodic material that is bonded to the environmental barrier but not to the substrate tank (no interstitial space is shown because in this configuration the space is dynamic; not being bonded, the anodic material will lift off of the tank if a force, such as the pressure of an electrolytic solution intervenes, otherwise, the exterior forces compress the anodic encasement sleeve against the tank, making the interstitial space so minimal that it does not appear as an appreciable distance in the drawing).
Figure 9:
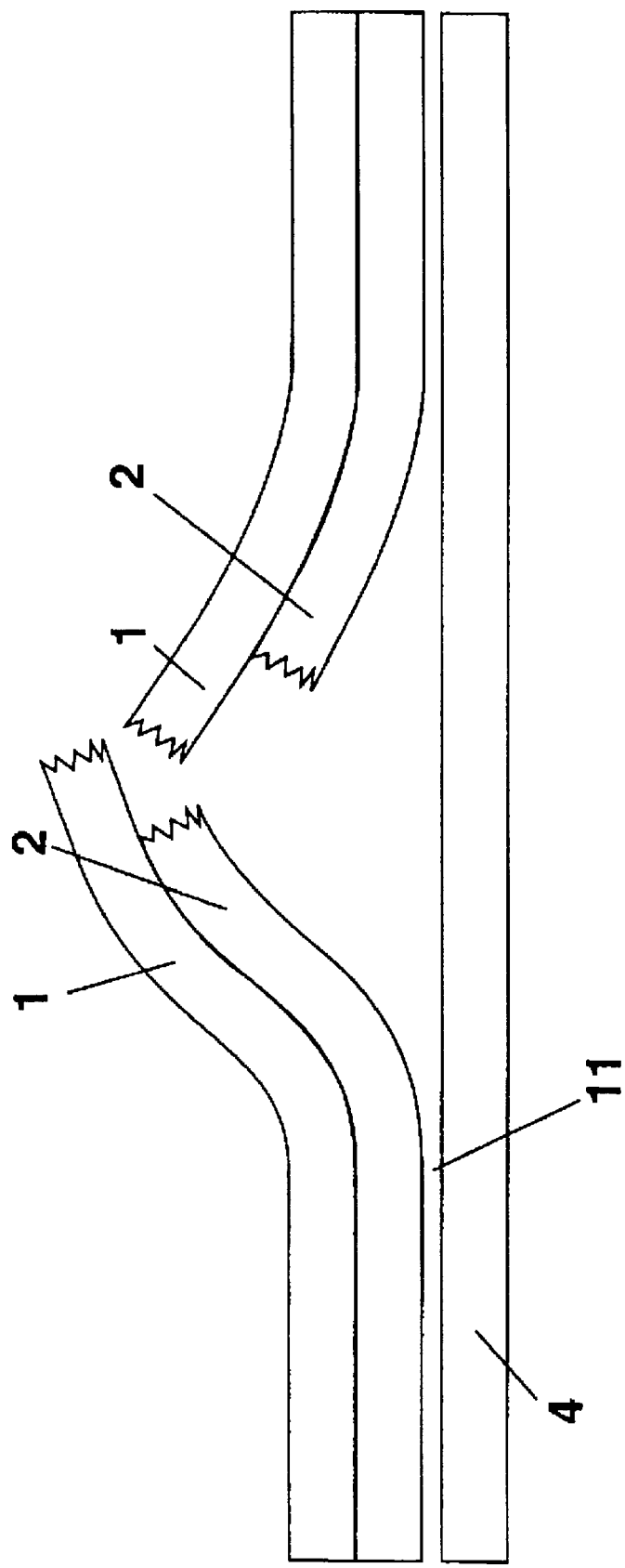
FIG. 9 depicts the greater volume of the electrolytic cell provided for when the anodic material can lift and create a "wetsuit" effect for the cathodic reaction.

The present invention's avoidance of continuous bonding between tank 4 and anodic material 2 can be best seen in FIGS. 2 and 9. In FIG. 2, spacers 6 are inserted between tank 4 and anodic material 2. These spacers may take many forms, including meshes, fabrics, wires, posts, or any other configuration or electrolyte-permeable intermediary layer 3 that may be apparent to those skilled in the art. FIG. 9 demonstrates that, even in absence of spacers 6, anodic material 2 is in liftable detachment from tank 4. (It will be recognized that at a minimum, anodic material 2 is attached to tank 4 at electrical connection 7, which may be even an adhesive bond; furthermore, a permeable intermediary layer 3 may be bonded to both anodic material 2 and tank 4, such that "lifting" is limited, so long as an operable interstitial space 11 is maintained.) By exterior pressures of the surrounding soil (in the case of a tank), the interstitial space 11 is maintained at a minimum, such that until electrolytic solution enters interstitial space 11, anodic material 2 will remain in close physical contact with tank 4, even though the facing surfaces are not connected in such a manner to prevent lifting. Because of the pressures, when electrolytic solution does enter interstitial space 11, the solution's movement will be to some degree confined to a localized area, but will retain sufficient conductivity and mobility to effect the advantages of this invention. Where interstitial space 11 is filled with electrolytic solution, the sleeve acts as a wetsuit, keeping a thin layer of solution sandwiched between anodic material 2 and tank 4. As can be seen in FIGS. 8 and 9, this substantially increases the ratio of exposed anode 9 to exposed tank 10, thus enhancing the cathodic protection available.

Bonded anodic systems, as those of prior art, are ill-equipped to handle large areas of surface damage to tank 4, as such damage typically will yield an ineffectively small ratio of exposed anode 9 to exposed tank 10. The relationship can be seen most clearly in FIG. 7, where exposed tank 10 greatly exceeds the surface area of exposed anode 9. This damage is typical of installation and transportation damage caused by machinery tearing through a resilient environmental barrier 1 (such as a polyethylene wrap), followed by scraping and abrasion of anodic material 2. Such damage is likely because if the machinery moves along the surface of tank 4 after penetration, environmental barrier 1 will tend to move with the machinery because of the resiliency of environmental barrier 1. Because of direct bonding to tank 4, however, anodic material is abraded rather than resiliently moving with environmental barrier 1 and with the machinery. As is clearly seen in FIG. 7 (*a*), the ratio of exposed anode 9 to exposed tank 10 is fractional at best. By way of contrast, where anodic material 2 is bonded to a flexible environmental barrier 1 rather than being bonded to tank 4, or being bonded to an inflexible environmental barrier, the anodic material 2 will be urged to move with the machinery, rather than to tear.

Figure 7B:
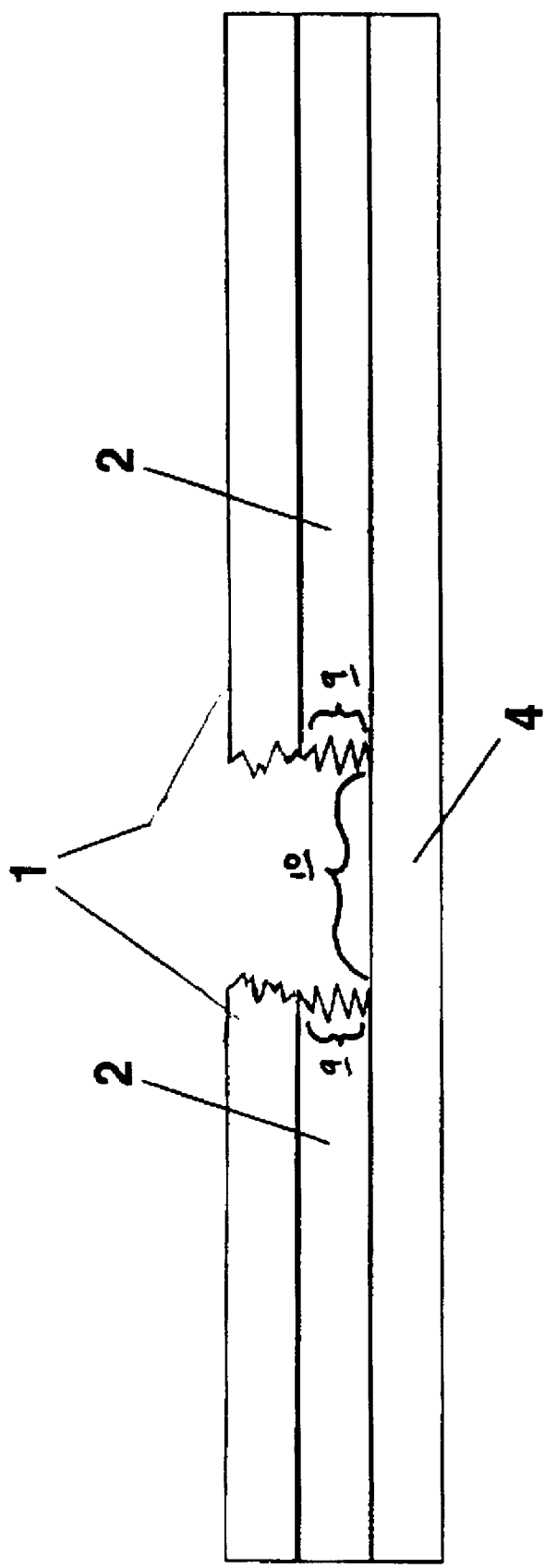

The damage-prone nature of prior art bonded anodic systems is exacerbated by the use of brittle environmental barriers. Such barriers include epoxy coatings and any other rigid or flaking coating. Where the environmental barrier in a bonded system is brittle, the area of damage to anodic material 2 is essentially equal to the area of damage to environmental barrier 1. This presents a situation in which electrolytic solution may free-flow into the potentially large holiday, allowing no opportunity for neutralization of the electrolytic solution, as the neutralized electrolytic solution may interchange with active solution. This condition is illustrated by FIG. 7*b*.

The use of mesh or grid configuration 13 of sacrificial anodic material 2 is believed to present superior anodic capabilities to a binder/particulate construction due to the recognition of the invention that interstitial space 11 is, contrary to the teaching of the prior art, beneficial. A mesh or grid configuration of the sacrificial anode layer allows for "pooling" of any present electrolyte 12 (represented by waves in FIG. 5) within the individual cells of the grid (see the blow-out of FIG. 5). This pooling effect is significant because it substantially increases the surface area of anodic material 2 that is available for any given quantity of electrolyte 12. As depicted in FIG. 5, walls 2*a* of each interior cell of grid 13 present an increased surface area over that which would be presented by a flat surface. The size of the individual cells of the mesh or grid 13 can be designed to present whatever surface area is desired, depending upon the anticipated electrolytic activity of the surrounding soil, the manufacturing tolerances feasible, and the costs anticipated. Alternatively, a foil may be overlaid to "top" the cells (e.g., on the side of the cells facing away from tank 4), or the grid could be composed of any roughly textured surface. Inventor discloses the mesh or grid 13 configuration in the interest of demonstrating the optimal theoretical configuration; in practice, however, it may be difficult or costly to obtain a mesh or grid 13 free of burrs and sharp edges. Such burrs and edges may tend to compromise environmental barrier 1, making simple foil more practicable where manufacturing precision and costs are a concern. In accordance with the recognition of the present invention that interstitial space 11 is not to be avoided, sacrificial anode 2 may take advantage of any surface-area increasing formats or configurations, including dimples, bumps, ridges, or any other configurations known to the art.

Environmental barrier 1 encases both tank 4 and anodic material 2, as may be seen in FIG. 2. The encasement can be completed by securing the ends of the sleeve to the tank by any known means, including drawstrings, lanyards, compression straps, adhesives, or mechanical locking or constriction devices; in fact, though not recommended, the invention may be practiced successfully by an interlocking folding together of ends of adjacent sleeves or by the tight wrapping of the terminating ends of sleeve material in reliance upon soil pressure to maintain such tight wrapping. The only requirement for the practice of the invention is that the open ends of a sleeve segment be arranged during installation in such a manner to retard and discourage the entry of electrolytic solution beneath environmental barrier 1. As will be appreciated in the art, this means that adjacent sections of sleeve will advantageously be overlapped (or, less advisably, abutted) in such a manner to present a substantially continuous environmental barrier 1 along the length of tank 4 to be protected, regardless of the number of discrete sleeve segments employed. For obvious reasons, a better seal yields a better practice of the invention. Following the practice of traditional polyethylene encasement, the preferred means of end-securement is the use of a drawstring or tape, for reasons of cost and proven effectiveness. This method of end-securement also bears the advantage that sections may slightly slide along with tank 4 with soil movement or where temperature changes may cause lengthening or constriction of tank 4 at a rate different from that of the anodic encasement sleeve.

It may be a desirable practice of the invention for consistency, tightness of fit, marketing, or other reasons to substantially encase tank 4 in the anodic encasement sleeve at the factory. In the event the anodic encasement sleeve is applied at the factory, the bell contour of tank 4 may not be encased due to manufacturing and transportation considerations. In such a situation, drawing of the anodic encasement sleeve over the bell or application of a supplementary anodic encasement sleeve at the joint area between segments of tank 4 could occur after assembly of the segments in the field.

For optimal results, environmental barrier 1 should be resilient. Most preferably, anodic material 2 is bonded or laminated to the resilient environmental barrier 1 (but not continuously to tank 4) by an adhesive or other continuous connective means. Although a continuous connective means to environmental barrier I theoretically yields the most resilient and forgiving anodic construction, the inventor recognizes that due to cost and other constraints continuous connective means may be impracticable or undesirable; in such circumstances bonding between environmental barrier 1 and anodic material 2 may be discontinuous.

Such bonding (whether continuous or discontinuous) between anodic material 2 and resilient environmental barrier 1 provides additional strength and protects anodic material 2 when destructive mechanical forces rupture the resilient environmental barrier 1. This protection is achieved because the resilient environmental barrier 1 typically possesses superior resiliency strength than the thin layers of anodic material 2 can possess. As discussed above, where anodic material 2 is continuously bonded directly to tank 4, an intrusive mechanical force is likely to remove anodic material 2 from the surface of the tank because of the friction between the tank and the invasive mechanical force. See FIG. 7. In the current invention, by contrast, because of the bonding of anodic material 2 to the resilient environmental barrier 1, and the lack of continuous bond between the anodial material 2 and the tank 4, if the resilient environmental barrier 1 is lifted off of the tank by the invasive mechanical force, anodic material 2 will be lifted to substantially the same extent. See FIG. 8 and FIG. 9. The advantage of this lifting of anodic material 2 is that any abrasion between the invasive mechanical force and tank 4 will not scrape free or abrade the anodic material 2. In the real-world installation environment, most damage that breaches environmental barrier 1 is due to rough handling, such as occurs when a backhoe or a lift gouges through environmental barrier 1. Such machine-caused damage is likely to tear a resilient environmental barrier 1 at only a discrete location for a short length, but may scrape and abrade the underlying tank 4 for a substantial length as the resilient environmental barrier 1 shifts along with the movement of the mechanical device. The result of such scraping and abrading is depicted at FIG. 7. Should foreign elements (e.g., pebbles or sand) remain beneath both anodic material 2 and environmental barrier 1, the "tenting" effect of such elements again serves to increase the surface area of anodic material 2 that is available to act sacrificially to the electrolytic processes, operating on the principles discussed in connection with the inventor's preference for grid or mesh 13. Although some form of bonding of anodic material 2 to environmental barrier 1 is preferred, it is possible to construct the sleeve of the invention without such bonding, though such a configuration will yield suboptimal protection of anodic material 2.

The construction of environmental barrier 1 may be of any material that provides substantial insulation from moisture and electrical currents. The inventor prefers to employ materials meeting the current polyethylene encasement standards of 800 v/mil dielectric resistance, though lower resistance is almost certainly acceptable in the present invention due to the additional protection provided by the cathodic/barrier synergy. As will be understood in the art, preferable materials should provide a long-term non-degrading moisture barrier, while at the same time exhibiting resistance to abrasion, tearing, and other forms of mechanical damage or stress. If desired, environmental barrier 1 may comprise more than one sublayer, each of which may optionally be directed toward a particular environmental protective function (e.g., an outer layer of abrasion resistive material, a middle layer of tear resistant material, and an inner layer of water and moisture proof material). Additional sublayers with additional functions may be incorporated into environmental barrier 1 as may be desired (whether bonded or unbonded). By way of example only, the inventor contemplates that additional environmentally insulative materials may be desired for stray current protection, thermal protection, or chemical protection, depending upon the application and aims of the installation. Considering the currently available alternatives, the most preferred construction of environmental barrier 1 for general purpose installation, even in highly corrosive soils, is polyethylene.

Alternative embodiments remaining within the spirit of the present invention are manifold. Additional intermediary layers 3 may be interposed into the sleeve construction between tank 4 and anodic material 2, so long as they do not substantially interfere with the electrochemical contact among the electrolytic solution, the anode, and the holiday-exposed tank. It is recognized that such intermediary layers 3 may be permeable or impermeable. Where such layers are permeable to the electrolytic solution, they may be bound directly to either tank 4 or anodic material 2, or, alternatively, to both anodic material 2 and tank 4, or to neither. The flexibility of bonding approaches when employing electrolyte-permeable materials is due to the fact that such permeability essentially ensures the presence of an effective interstitial space (e.g., the continuity of the pores of the permeable material). Where such intermediary layers 3 are impermeable, the practice of the current invention requires that they be continuously bonded to tank 4 (or to another impermeable layer or set of impermeable layers that is bonded directly to tank 4, so that in the area between anodic material 2 and tank 4, no interstitial space 11—including permeable materials—is present between any impermeable material and tank 4). Impermeable materials should not be bonded continuously along anodic material 2 (where they would limit anodic surface area available).

The acceptability of bonding is primarily determined functionally: anodic material should not be substantially "shielded" from the electrolytic solution that is in closest contact with tank 4 (at least on the tank-facing surface of anodic material 2), while tank 4 may be acceptably be shielded from the electrolytic solution at all points except holidays. (It is accepted that anodic material 2 may at various points be bonded to tank 4 or other materials which may "shield" the electrolytic activity to some degree, so long as the areas so bonded are not so great in comparison to the whole as to hinder anodic activity). Finally, it is recognized that depending upon materials and construction, intermediary layers 3 may exhibit a tendency to interfere with seepage of electrolyte between anodic material 2 and tank 4. In this case, as well, the amount of interference acceptable is a functional question: intermediary layers 3 should not encourage seepage to the extent that electrolytic solution is free-flowing from the bedding soil into interstitial space 11; neither, however, should intermediary layers 3 be so restrictive of seepage that such layers interfere with the efficient maximization of anodic surface area available for contact with the electrolytic solution.

Where intermediary layer 3 is electrolyte permeable, the electrolytic circuit between anodic material 2 and tank 4 will be uninterrupted if electrolyte has entered the system. This permeable intermediary layer 3 may compliment or substitute for the mesh or grid configuration, because the layer may provide lifting effect, in combination with the electrolyte permeability, and thus enhance current flow among greater surface areas of anodic material 2. Furthermore, permeable intermediary layer 3 may be an abrasive-resistant laminate that is bonded directly to anodic material 2. The tear and abrasion resistance imparted would further reduce the likelihood of damage to anodic material 2, as it would be protected on both tank-side and barrier-side curviplanar surfaces. As in the preferred embodiment, above, anodic material 2 should have a physical electrically conductive connection to the metal being protected, by use of bolts, welds, wires, conductive adhesives 7, etc. It will be apparent to those in the art that any number of permeable intermediary layers 3 may be interposed between anodic material 2 and tank 4, with any combination of bonding schemes among such layers, so long as all layers are permeable and all bonding schemes are permeable as well.

A related alternative embodiment employs intemediary layer 3 bonded directly to tank 4. In this construction intermediary layer 3 may be either electrolyte permeable or impermeable. Where intermediary layer 3 is impermeable, it will serve as an additional environmental barrier. Because no electrolyte will contact tank 4 except at holidays, the area of tank 4 requiring cathodic protection will be discrete. Further, because anodic material 2 is immediately adjacent to interstitial space 11, any electrolyte in interstitial space 11 will be in circuit with discrete holiday area of tank 4 and the large surface area of anodic material 2. This creates an efficient cathodic cell, which overcomes the tendency for acceleration of corrosion at discrete points of holidays. Examples of such bonded intermediary layers 3 may be asphaltic paints and coatings as are traditionally applied in the art. Finally, where intermediary layer 3 is permeable, it does not interfere with the electrolytic mobility or electrochemical activity.

Figure 3:
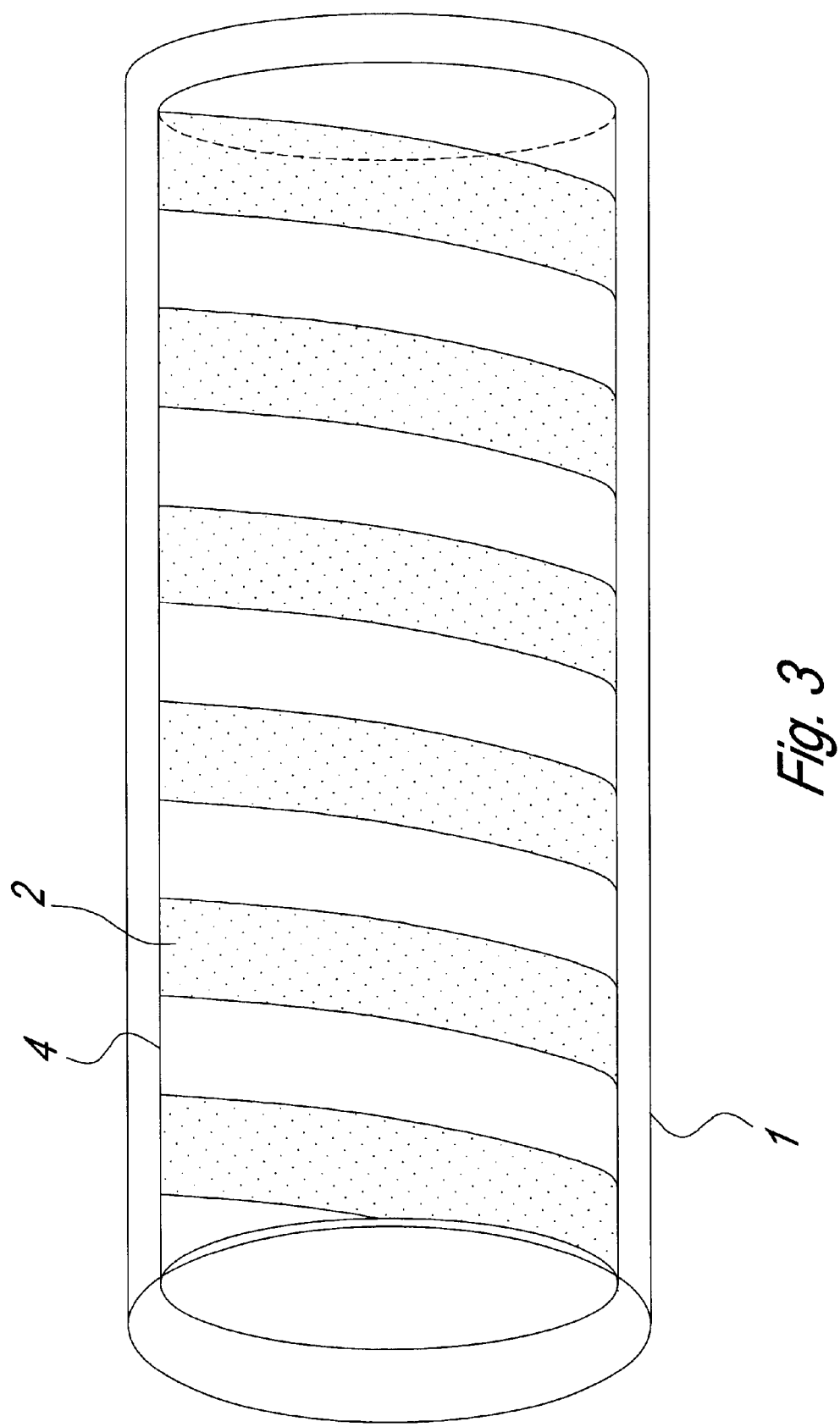
FIG. 3 depicts the embodiment employing spirally wrapped anodic foil electrically connected to a conductive inner lining of an environmental barrier FIG. 4 portrays the embodiment employing longitudinally wrapped anodic foil electrically connected to a conductive inner lining of an environmental barrier FIG. 5 highlights the operative configuration of a mesh or grid embodiment of the anodic material, and demonstrates how surface area of such a grid or mesh is greater than that of a flat foil.
Figure 4:
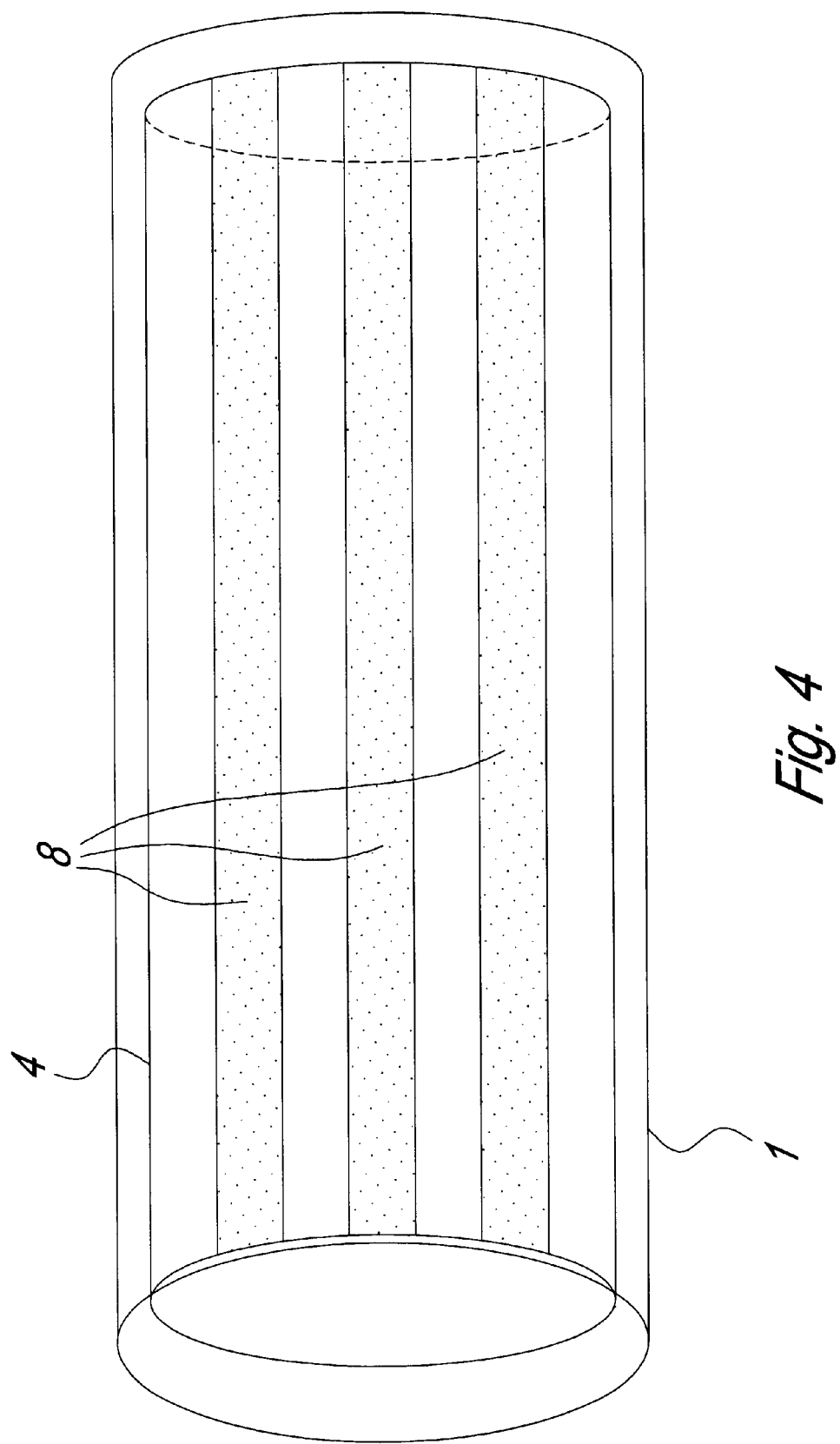
Figure 5:
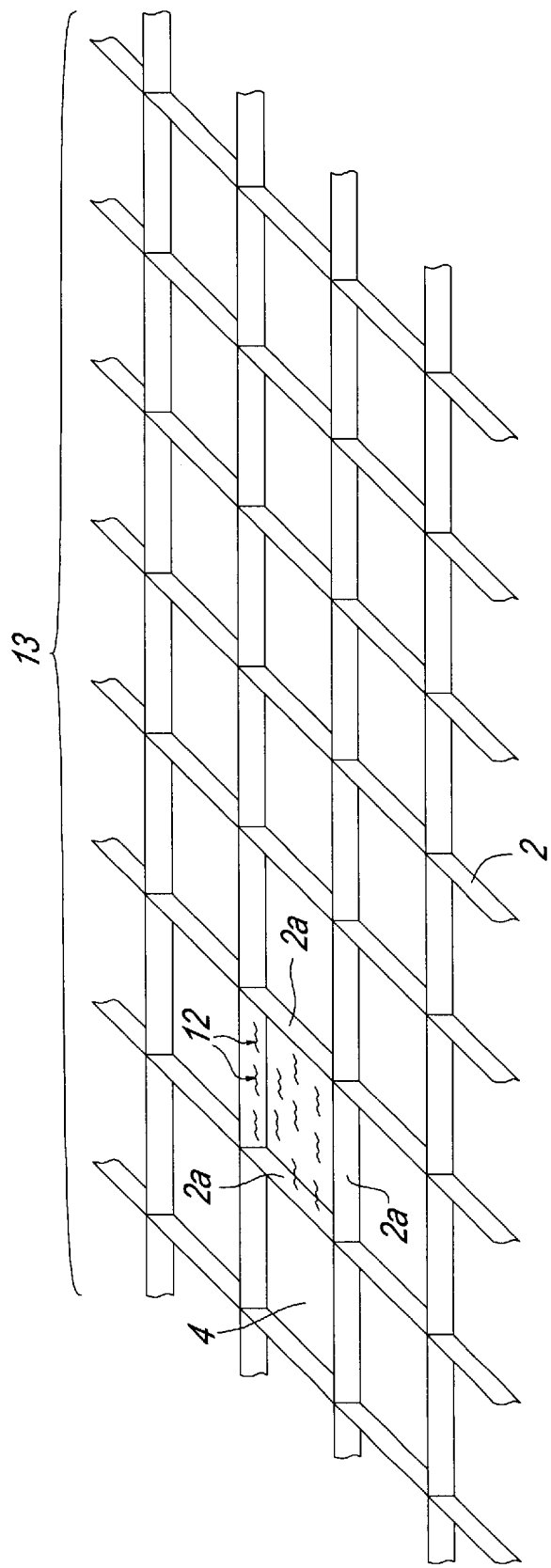

In another alternative embodiment, anodic material 2 may be discontinuous along the tank-facing surface of environmental barrier 1, as is depicted in FIG. 3 and FIG. 4. Conceivable configurations include spiral wrapping of a foil strip of anodic material 2, to provide the appearance of a barber's pole if viewed in absence of environmental barrier 1. Such foil strips also could be circumferentially wrapped (e.g., like parallel bands) or longitudinally run the length of the tank 4. Where such discontinuous configurations of anodic material 2 are employed, it is strongly recommended that the connection between anodic material 2 and environmental barrier 1 be conductive, and that the individual discontinuous segments of anodic material 2 are electrically connected to one another via an environmental barrier with an inner layer or surface which is electrically conductive.

Advantages and alternative embodiments of the present disclosure, whether to its preferred embodiment or in embodiments that shall be apparent to those in the art, and are intended to be within the scope of this invention.

I claim:

1. A method for protecting a corrosible metallic element of a tank, comprising the steps of:
   a. overlaying at least a portion of said tank with a sacrificial anodic material, said sacrificial anodic material having a tank-facing surface and a barrier-facing surface;
   b. electrically connecting said corrosible metallic element to said sacrificial anodic material by means for conducting electrical current; and
   c. encasing said tank and said sacrificial anodic material in an environmental barrier.

2. A method for protecting a corrosible metallic element of a tank as in claim 1, further comprising the step of leaving an interstitial space between said tank and said tank-facing surface of said sacrificial anodic material, said interstitial space being capable of admitting an electrolytic solution.

3. A method for protecting a corrosible metallic element of a tank as in claim 1, wherein said tank facing surface of said sacrificial anodic material is free of bonding to any electrolyte-impermeable material along an area great enough to cathodically protect a greatest surface area of said tank as may be anticipated to be exposed to an electrolyte.

4. A method for protecting a corrosible metallic element of a tank as in claim 3, wherein a majority of said tank facing surface of said sacrificial anodic material remains in unbonded contact with said tank, whereby an unbonded interstitial space exists between said sacrificial anodic material and said tank.

5. A method for protecting a corrosible metallic element of a tank as in claim 3, further comprising the step of disposing between said tank and said sacrificial anodic material an electrolyte-permeable intermediary layer.

6. A method for protecting a corrosible metallic element of a tank as in claim 3, further comprising the step of bonding an electrolyte-impermeable intermediary layer to said tank, wherein such bonding effects an electrolyte impermeable connection between said electrolyte-impermeable intermediary layer and said tank.

7. A method for protecting a corrosible metallic element of a tank as in claim 3, wherein said electrically connecting step comprises conductively securing a plurality of electrically conductive connections between said tank and said sacrificial anodic material, such that connections are spaced in finctional relation to one another in such a manner that an electrolytic potential of said tank remains substantially uniform along an exterior surface of said tank.

8. A method for protecting a corrosible metallic element of a tank as in claim 3, wherein said environmental barrier comprises a dielectric moisture resistant material, and wherein said sacrificial anodic material comprises a metal possessing an electromotive potential greater than that of the a corrosible metallic element to be protected.

9. A method for protecting a corrosible metallic element of a tank as in claim 8, wherein said environmental barrier comprises polyethylene.

10. A method for protecting a corrosible metallic element of a tank as in claim 3, wherein said environmental barrier comprises a plurality of sublayers.

11. A method for protecting a corrosible metallic element of a tank as in claim 3 further comprising the step of connecting said anodic material to said environmental barrier in a manner such that movement of said environmental barrier yields concomitant movement of said anodic material.

12. A method for protecting a corrosible metallic element of a tank as in claim 3, wherein said anodic material is selected from the group consisting of zinc, aluminum, magnesium, and alloys comprising zinc, aluminum, or magnesium.

13. A method for protecting a corrosible metallic element of a tank as in claim 3, wherein the step of overlaying said tank with said sacrificial anodic material is performed by a process selected from the group consisting of disposing a strip of said sacrificial anodic material spirally relative to said tank, disposing a band of said sacrificial anodic material circumferentially relative to said tank, disposing strips of said sacrificial anodic material longitudinally relative to said tank, disposing a substantially continuous foil of said sacrificial anodic material around said tank, disposing a mesh of said sacrificial anodic material around said tank, disposing a composite material comprising said sacrificial anodic material in particulate form adjacent to said tank, and disposing an expanded metal of said sacrificial anodic material adjacent to said tank.

14. A method for protecting a corrosible metallic element of a tank as in claim 3, wherein said sacrificial anodic material comprises a plurality of discontinuous sections of said sacrificial anodic material.

15. A method for protecting a corrosible metallic element of a tank as in claim 14, wherein at least two of said discontinuous sections of said sacrificial anodic material are connected by means for providing electrical conductivity.

16. A method for protecting a corrosible metallic element of a tank as in claim 15, wherein said electrical conductivity means comprises an electrically conductive inner surface of said environmental barrier, which inner surface is electrically connected to said at least two of said discontinuous sections by electrically conductive adhesive.

17. A method for protecting a corrosible metallic element of a tank as in claim 1, wherein said step of electrically connecting said corrosible metallic element to said sacrificial anodic material comprises securing a portion of said tank-facing surface of said sacrificial anodic material to said corrosible metallic element with electrically conductive adhesive, in such a manner that said tank facing surface of said sacrificial anodic material is free of bonding to any electrolyte-impermeable material along an area great enough to cathodically protect a greatest surface area of said tank as may be anticipated to be exposed to an electrolyte.

18. An apparatus for protecting a corrosible metallic element of a tank comprising:
   a. a sacrificial anodic metal;
   b. an environmental barrier adapted to encase said tank and said sacrificial anodic material; and
   c. means for electrically connecting said sacrificial anodic material to said corrosible metallic element of said tank, said sacrificial anodic material being positioned in relation to said tank such that if an electrolytic solution comes into contact with said tank, said electrolytic solution may also enter between said sacrificial anodic material and said tank.

19. An apparatus for protecting a corrosible metallic element of a tank comprising:
   a. a sacrificial anodic metal comprising a metal possessing an electromotive potential greater than that of the corrosible metallic element to be protected;
   b. means for electrically connecting said sacrificial anodic material to a corrosible metallic element of said tank, said environmental barrier being dielectric and moisture resistant;
   c. an environmental barrier adapted to encase said tank and said sacrificial anodic material; and
   d. means for allowing presence of an electrolytic fluid between said tank and said sacrificial anodic material.

* * * * *